United States Patent
Hwang

(10) Patent No.: US 9,605,373 B2
(45) Date of Patent: Mar. 28, 2017

(54) WATER SUPPLY VALVE AND WATER SUPPLY VALVE ASSEMBLY FOR WALL MOUNTED DRUM TYPE WASHING MACHINE

(71) Applicant: Dongbu Daewoo Electronics Corporation, Seoul (KR)

(72) Inventor: Ui Kun Hwang, Bucheon-si (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 46 days.

(21) Appl. No.: 14/137,458

(22) Filed: Dec. 20, 2013

(65) Prior Publication Data

US 2015/0128659 A1    May 14, 2015

(30) Foreign Application Priority Data

Nov. 12, 2013    (KR) .......................... 10-2013-0136731

(51) Int. Cl.
| | |
|---|---|
| *F16K 11/24* | (2006.01) |
| *D06F 39/02* | (2006.01) |
| *F16K 15/18* | (2006.01) |
| *D06F 39/08* | (2006.01) |

(52) U.S. Cl.
CPC ............ *D06F 39/028* (2013.01); *F16K 11/24* (2013.01); *F16K 15/18* (2013.01); *D06F 39/088* (2013.01); *Y10T 137/0318* (2015.04); *Y10T 137/87877* (2015.04)

(58) Field of Classification Search
None
See application file for complete search history.

(56) References Cited

U.S. PATENT DOCUMENTS

| | | | | |
|---|---|---|---|---|
| 2,653,618 | A * | 9/1953 | Frank ................. | A47L 15/4445 |
| | | | | 131/242.6 |
| 6,463,766 | B2 * | 10/2002 | Kubota ................ | D06F 35/004 |
| | | | | 68/12.18 |
| 2004/0148975 | A1 | 8/2004 | No et al. | |
| 2005/0000254 | A1 | 1/2005 | Rotta et al. | |
| 2005/0166645 | A1 * | 8/2005 | Favret .................... | D06F 39/02 |
| | | | | 68/12.18 |
| 2005/0188730 | A1 * | 9/2005 | Zsambeki ............. | D06F 39/088 |
| | | | | 68/17 R |

(Continued)

FOREIGN PATENT DOCUMENTS

| | | |
|---|---|---|
| CN | 102162185 A | 8/2011 |
| EP | 0688896 | 12/1995 |

(Continued)

*Primary Examiner* — Michael Barr
*Assistant Examiner* — Christi Tate-Sims

(57) ABSTRACT

A water supply valve for a wall mounted drum type washing machine may include an integrated inlet housing, first water supply valve outlet housing, and second water supply valve outlet housing. The water supply valve includes an inlet housing including an inlet into which water enters and a first passage along an inner cavity; a first water supply valve outlet housing integral with and adjacent to the inlet housing and configured to communicate with the first passage; and a second water supply valve outlet housing integral with and adjacent to the first water supply valve outlet housing and configured to communicate with the first passage.

13 Claims, 9 Drawing Sheets

(56) References Cited

U.S. PATENT DOCUMENTS

2011/0154865 A1* 6/2011 Lee .................. D06F 39/088
                                                    68/200
2012/0240344 A1* 9/2012 Lv ................... D06F 39/022
                                                    8/137

FOREIGN PATENT DOCUMENTS

| EP | 1600546 | | 11/2005 | | |
|---|---|---|---|---|---|
| EP | 2360309 | A1 * | 8/2011 | ............ | D06F 33/02 |
| EP | 2447410 | | 5/2012 | | |
| EP | 2477410 | A1 * | 7/2012 | ........... | H04N 19/597 |
| EP | 2657387 | | 10/2013 | | |
| FR | 2232717 | | 1/1975 | | |
| FR | 2959248 | | 10/2011 | | |
| GB | 1411532 | | 10/1975 | | |
| GB | 2138451 | | 10/1984 | | |
| IT | WO2011/051184 | A1 * | 5/2011 | ............ | D06F 39/12 |
| JP | H03168485 | | 7/1991 | | |
| JP | 3021488 | * | 7/1995 | ............ | F16K 31/06 |
| JP | 3021488 | | 2/1996 | | |
| KR | 2019900004287 | | 5/1990 | | |
| WO | 2014106617 | | 7/2014 | | |

* cited by examiner

WATER SUPPLY VALVE AND WATER SUPPLY VALVE ASSEMBLY FOR WALL MOUNTED DRUM TYPE WASHING MACHINE

CROSS-REFERENCE TO RELATED APPLICATIONS

This application is based on and claims priority from Korean Patent Application No. 10-2013-0136731, filed on Nov. 12, 2013, which is hereby incorporated herein in its entirety by reference.

TECHNICAL FIELD

The present disclosure relates to a water supply valve and a water supply valve assembly for a wall mounted drum type washing machine, and more particularly, to a water supply valve and a water supply valve assembly for a wall mounted drum type washing machine, in which an inlet, a first water supply outlet housing, and a second water supply outlet housing are integrated, so that one water supply valve assembly has at least two passages to supply water to a detergent container and a softener container (which, in turn, supply water and detergent, or water and softener, to a drum).

BACKGROUND

A washing machine is an apparatus that performs a washing cycle, a rinsing cycle, and a spin-drying cycle using the driving force of a motor to wash laundry.

Generally, washing machines may be classified as pulsator type (full automatic washing machine), drum type, agitator type, or the like, depending on a washing action type.

Today, because the amount of laundry done per family has in some instances been reduced given the trend toward nuclear families, a need to wash an infant's laundry separately has been increasingly recognized, and other specialized applications for small load washing machines have been realized, the demand for smaller washing machines has increased. To meet the demand and minimize the space that the washing machines occupy, a wall mounted drum type washing machine has been developed.

Generally, a wall mounted drum type washing machine refers to a drum type washing machine that holds a small amount of laundry and that can be mounted on a wall.

FIG. 1 illustrates a perspective view of a conventional wall mounted drum type washing machine 1 according to the related art. The wall mounted drum type washing machine is fixed or fastened onto a wall by one or more fixtures.

A tub 2 is filled with washing water which is supplied by a water supply valve (not illustrated).

A case 3 forms an outer surface of the wall mounted drum type washing machine.

A rotatable cylindrical drum 4 is between the tub 2 and the case 3, that is, in the case 3.

A front of the case 3 has a door 5. This configuration enables a user to put the laundry into the drum 4 by opening the door 5.

An operation part or operation controller 6 is at a lower portion of the case 3, below the doors. The washing cycle, the rinsing cycle, and the spin-drying cycle are selectively or sequentially performed, based on a user's operation of the operation part or operation controller 6.

The wall mounted drum type washing machine 1 is operated by opening the door 5, putting the laundry into the drum 4, closing the door 5, and operating the operation part or operation controller 6 to select one or more operations and/or their sequence and/or duration after the application of power.

When the wall mounted drum type washing machine 1 is operated, water is introduced into the tub 2 by operating a water supply valve, and the water introduced into the tub 2 enters the drum 4. When water above a predetermined water level enters the drum 4, the motor is operated by a microcomputer and transfers rotating power to the drum 4. The laundry in the drum 4 is washed by rotating the drum 4.

The conventional wall mounted drum type washing machine according to the related art includes a first water supply valve that is connected to a detergent box and a separate second water supply valve that is connected to a softener box. That is, each water supply valve has one passage, and two separate water supply valves supply water to the detergent box and to the softener box. Therefore, the manufacturing cost and assembly time of the wall mounted drum type washing machine 1 may increase.

Because two water supply valves are present, the overall size of the wall mounted drum type washing machine 1 may increase, and it may be difficult to decrease the size of the conventional wall mounted drum type washing machine.

Conventional wall mounted drum-type washing machines may be disclosed in Korean Patent Laid-Open Patent Publication No. 10-2013-0077994 and Korean Patent Laid-Open Patent Publication No. 10-2013-0064627.

SUMMARY

One or more embodiments of the present disclosure minimizes the space occupied by a wall mounted drum type washing machine and reduces its manufacturing cost and assembly time, by supplying detergent and softener to the drum through one water supply valve and/or assembly using two passages in the one water supply valve assembly. In one or more embodiments, an inlet housing, a first water supply outlet housing (e.g., for supplying water to a detergent container), and a second water supply outlet housing (e.g., for supplying water to a fabric softener container) are integrated into a single unit.

The present invention minimizes a space occupied by the wall mounted drum type washing machine and saves replacement time and costs when a defect occurs in the water supply valve assembly, by allowing the water supply valve assembly, including a plurality of water supply valves, to supply water to a detergent container and to a softener container through one water supply valve assembly.

An exemplary embodiment of the present disclosure includes an integrated water supply valve assembly for a wall mounted drum type washing machine, including an inlet housing including an inlet into which water enters, and a first passage along an inner cavity thereof; a first water supply valve outlet housing integral with and adjacent to the inlet housing that is configured to communicate with the passage; and a second water supply valve outlet housing integral with and adjacent to the first water supply valve outlet housing, configured to communicate with the first passage.

The first water supply valve outlet housing may include a seating part at an upper portion of the first water supply valve outlet housing having a first solenoid valve thereon; a protrusion at or on a lower portion of the first water supply valve outlet housing and having a first outlet at a lower end thereof; and a second passage extending from the first passage to the first outlet.

The first water supply valve outlet housing may further include a plurality of insertion holes in the seating part.

The second water supply valve outlet housing may include a seating part at an upper portion of the second water supply valve outlet housing having a second solenoid valve thereon; a protrusion at or on a lower portion of the second water supply outlet housing and having a second outlet at a lower end thereof; and a third passage extending from the first passage to the second outlet.

The second water supply valve outlet housing may further include a plurality of insertion holes in the seating part.

Another exemplary embodiment of the present disclosure comprises a water supply valve assembly for a wall mounted drum washing machine, including a check valve at an inlet at or in an inlet housing; a first solenoid valve on a seating part at an upper portion of a first water supply valve outlet housing; and a second solenoid valve on a seating part at an upper portion of a second water supply valve outlet housing.

The water supply valve assembly for a wall mounted drum type washing machine may further include: a fixing bracket having an I shape, in which a first part of the fixing bracket may be fixed and/or fastened to the first solenoid valve and a second part of the fixing bracket may be fixed and/or fastened to the second solenoid valve.

The fixing bracket may be coupled with upper ends of the seating parts of the water supply valve outlet housings by one or more screws or bolts in insertion holes in the seating parts.

The water supply valve assembly for the wall mounted drum type washing machine according to exemplary embodiments of the present disclosure includes at least two passages to supply water to the detergent container and the softener container, thereby reducing or minimizing the mounting space of the water supply valve assembly, and miniaturizing the wall mounted drum type washing machine.

The water supply valve assembly for the wall mounted drum type washing machine according to exemplary embodiments of the present disclosure may save manufacturing costs of the wall mounted drum type washing machine and reduce the assembly time thereof, thereby improving productivity.

The water supply valve assembly for the wall mounted drum type washing machine according to exemplary embodiments of the present disclosure, may be easily replaced when a defect occurs in the water supply valve or the water supply valve assembly, thereby saving maintenance costs.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
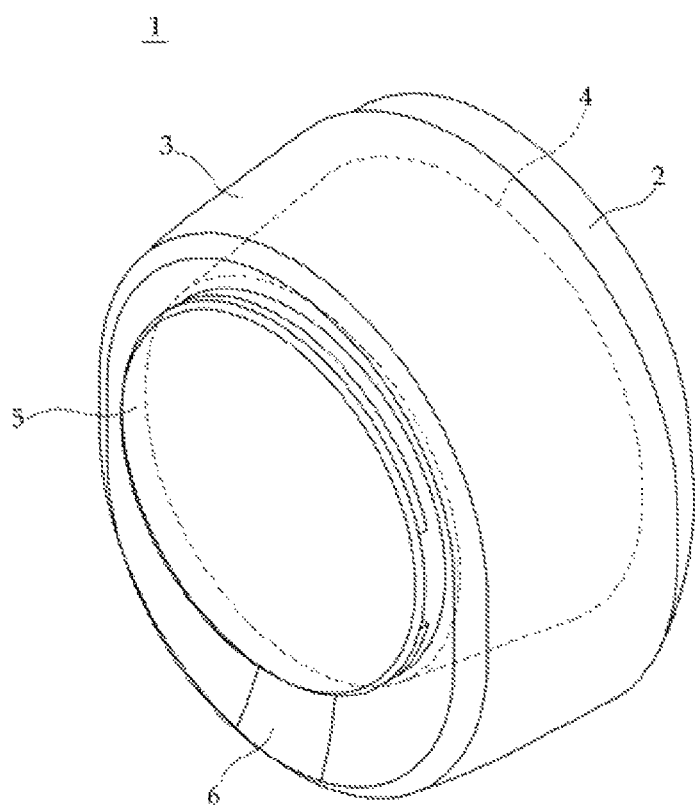
FIG. 1 is a perspective view of a conventional wall mounted drum type washing machine.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein.

Exemplary embodiments of the present disclosure will be described in detail with reference to the accompanying drawings. In adding reference numerals to components of each drawing, like components are denoted by like reference numerals.

Figure 2:
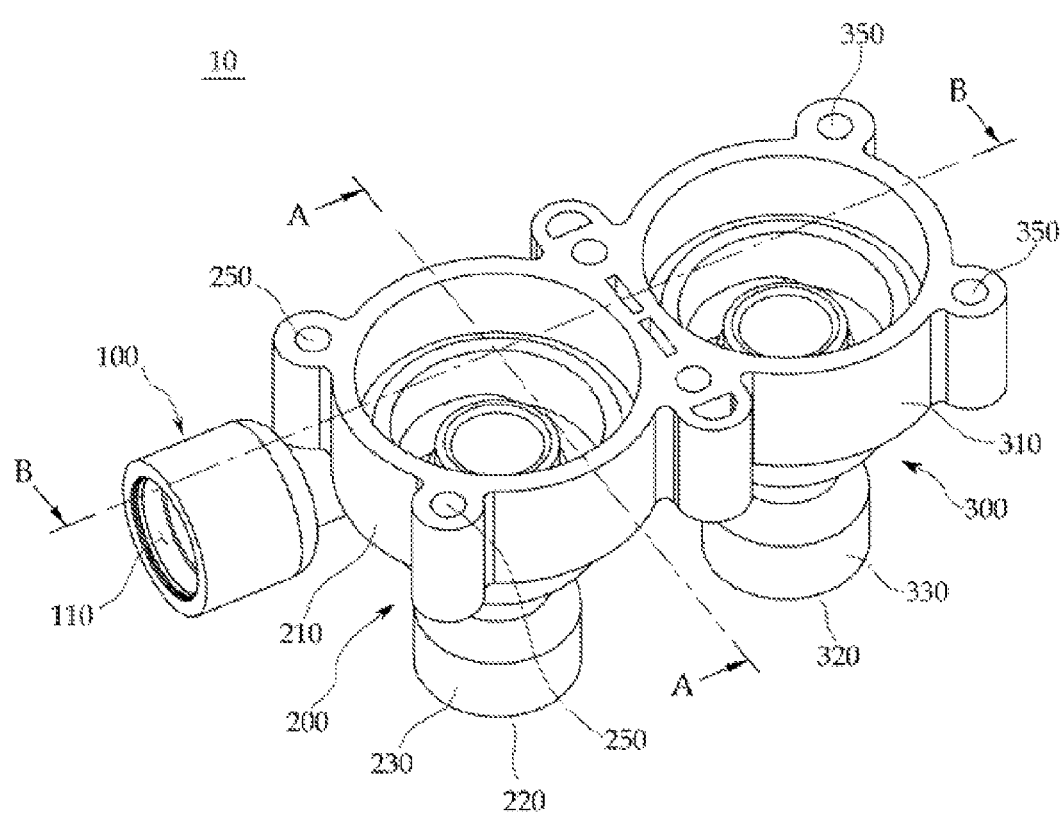
FIG. 2 is a front perspective view of a water supply valve assembly for a wall mounted drum type washing machine according to one or more exemplary embodiments of the present disclosure.
Figure 3:
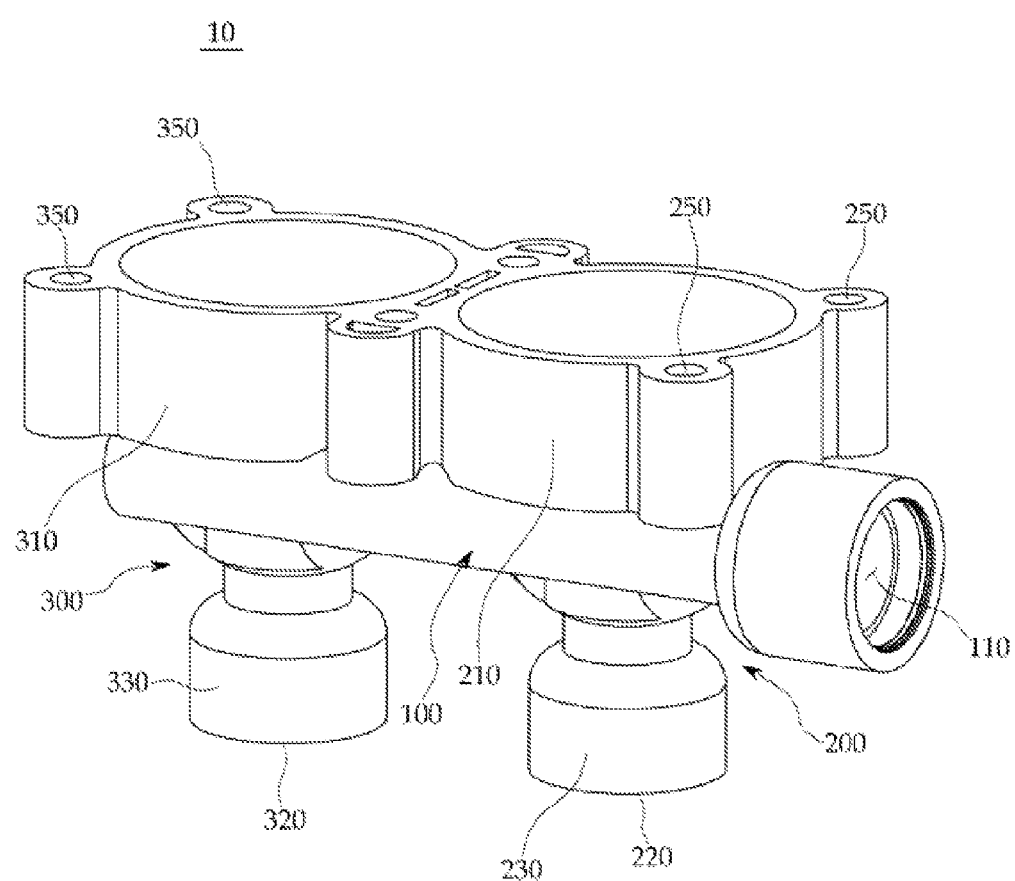
FIG. 3 is a rear perspective view of the water supply valve assembly for a wall mounted drum type washing machine according to one or more exemplary embodiments of the present disclosure.
Figure 4:
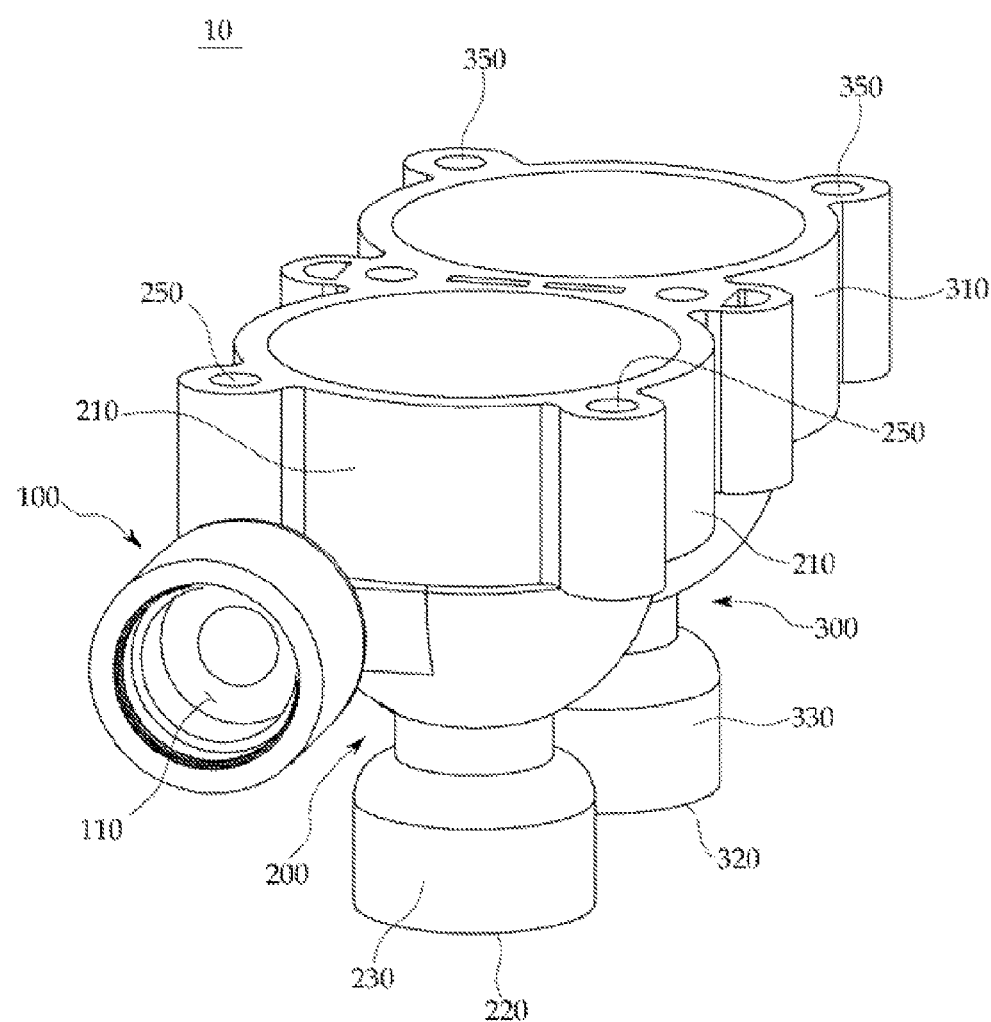
FIG. 4 is a side perspective view of the water supply valve assembly for a wall mounted drum type washing machine one or more according to an exemplary embodiment of the present invention.
Figure 5:
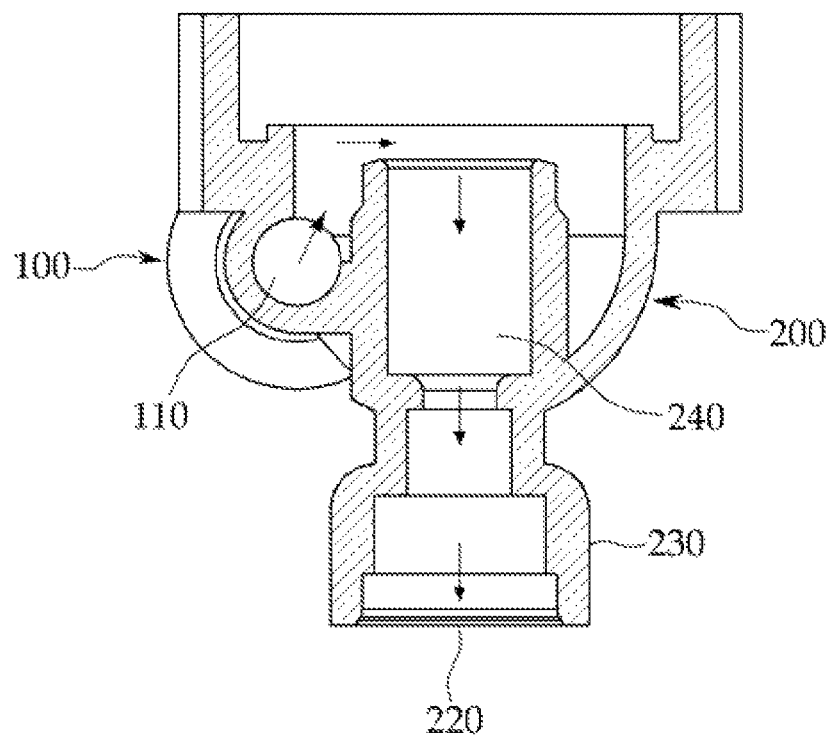
FIG. 5 is a cross-sectional view taken along the line A-An illustrated in FIG. 2.
Figure 6:
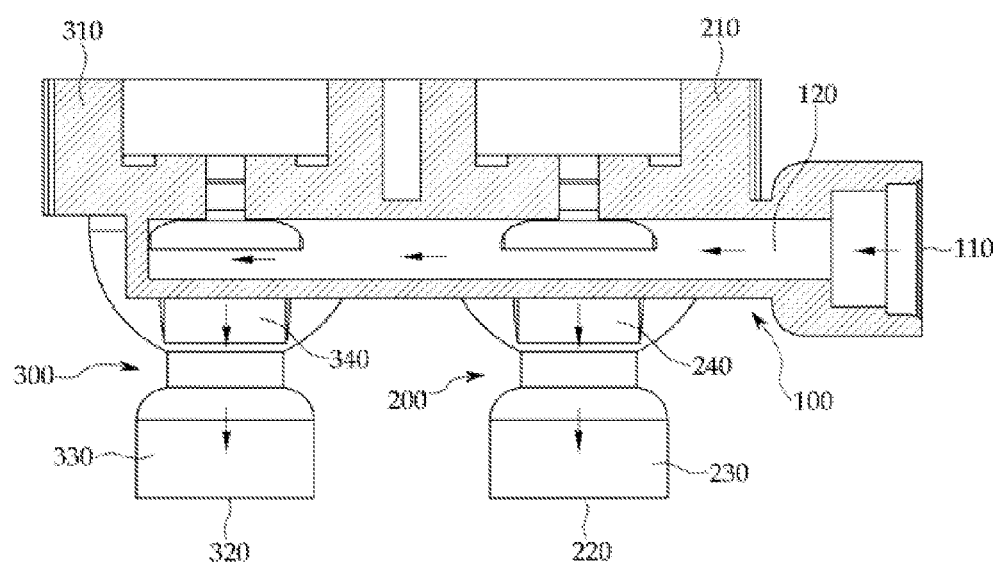
FIG. 6 is a cross-sectional view taken along the line B-B illustrated in FIG. 2.

FIG. 2 is a front perspective view of a water supply valve 10 for a wall mounted drum type washing machine according to one or more exemplary embodiments of the present disclosure, FIG. 3 is a rear perspective view of the water supply valve 10 for a wall mounted drum type washing machine according to one or more exemplary embodiments of the present disclosure, and FIG. 4 is a side perspective view of the water supply valve 10 for a wall mounted drum type washing machine according to one or more exemplary embodiments of the present disclosure. FIG. 5 is a cross-sectional view taken along the line A-A illustrated in FIG. 2; and FIG. 6 is a cross-sectional view taken along the line B-B illustrated in FIG. 2.

A water supply valve 10 for a wall mounted drum type washing machine according to one or more exemplary embodiments of the present disclosure will be described with reference to FIGS. 2 to 6. The water supply valve 10 for a wall mounted drum type washing machine according to one or more exemplary embodiments of the present disclosure includes an inlet housing 100, a first water supply valve outlet housing 200, and a second water supply valve outlet housing 300.

As illustrated in FIGS. 2 to 6, the inlet housing 100 has an inlet 110. Water introduced through a hose (not illustrated) which is connected to a faucet through the inlet 110 is introduced into the inlet housing 100. The inlet housing 100 includes a first passage 120 that extends along an inner cavity of inlet housing 100 and has a predetermined length and diameter. The water flows in the first water supply valve outlet housing 200 or the second water supply valve outlet housing 300, which will be described below, through the first passage 120.

The first water supply valve outlet housing 200 is integral with and adjacent to the inlet housing 100 and is configured to communicate with the first passage 120 in the inlet housing 100.

The second water supply valve outlet housing 300 is integral with and adjacent to the first water supply valve outlet housing 200 and is configured to communicate with the first passage 120 in the inlet housing 100. The second water supply valve outlet housing 300 is adjacent to first water supply valve outlet housing 200 and is configured not to communicate with the first water supply valve outlet housing.

The inlet housing 100, the first water supply valve outlet housing 200, and the second water supply valve outlet housing 300 described above may be integrated with each other. Although not necessarily limited thereto, in one embodiment, the water supply valve assembly 10, that is, the inlet housing 100, the first water supply valve outlet housing 200, and the second water supply valve outlet housing 300 preferably comprise a plastic material, but may also comprise a metal, if necessary and/or desired. The water supply valve assembly 10 may be manufactured by known methods, such as molding, casting, and injection molding, and the inlet housing 100, the first water supply valve outlet housing, and the second water supply valve outlet housing 300 may be integrated as a result.

As illustrated in FIGS. 2 to 6, the first water supply valve outlet housing 200 of the water supply valve 10 for a wall mounted drum type washing machine according to one or more exemplary embodiments of the present disclosure includes a seating part 210, a protrusion 230, and a passage 240. The first water supply valve outlet housing 200 of the water supply valve 10 for a wall mounted drum type washing machine according to one or more exemplary embodiments of the present disclosure will be described with reference to FIGS. 2 to 6.

The seating part 210 is at an upper portion of the first water supply valve outlet housing 200. The seating part 210 may have a first solenoid valve which may selectively open and close the second passage 240 to be described below.

The protrusion 230 at a lower portion of the first water supply valve outlet housing 200. A lower end of the protrusion 230 has a first outlet 220.

The second passage 240 extends from the first passage 120 of the inlet housing 100 to the first outlet 220. That is, the first water supply valve outlet housing 200 and the protrusion 230 which are configured to communicate with the inlet housing 100 communicate with each other. And, the second passage 240 of the first water supply valve outlet housing 200 extends from the first passage 120 to the first outlet 220 which is configured to communicate with the inlet housing 100.

Although not illustrated in the drawings, according to one or more exemplary embodiments of the present disclosure, the first water supply valve outlet housing 200 is connected to a detergent container or box to output water to the drum of the washing machine, in which the water supplied through the first passage 120 and the first outlet 220 is transferred to a detergent container or box (not shown) positioned in or at least partially over the drum of the washing machine.

The first water supply valve outlet housing 200 of the water supply valve 10 for the wall mounted drum type washing machine according to one or more exemplary embodiments of the present disclosure may further include insertion holes 250. A plurality of insertion holes 250 may be included at a portion of the seating part 210 and one end of a fixing bracket 700 may be fixed and/or fastened to an upper surface of the first water supply valve outlet housing 200 by a fastener such as a bolt, a screw, and a rivet.

As illustrated in FIGS. 2 to 6, the second water supply valve outlet housing 300 of the water supply valve assembly 10 for a wall mounted drum type washing machine according to one or more exemplary embodiments of the present disclosure includes a seating part 310, a protrusion 330, and a third passage 340. The second water supply valve outlet housing 300 of the water supply valve assembly 10 for a wall mounted drum type washing machine according to one or more exemplary embodiments of the present disclosure will be described with reference to FIGS. 2 to 6.

The seating part 310 is at the upper portion of the second water supply valve outlet housing 300. The seating part 310 may have a second solenoid valve which may selectively open and close the third passage 340 as is described below. That is, when the second solenoid valve is closed, the water may flow through the second passage 240 of the first water supply valve outlet housing (e.g., when the solenoid over the first water supply valve outlet is open).

The protrusion 330 is at a lower portion of the second water supply valve outlet housing 300. A lower end of the protrusion 330 has a second water supply valve outlet 320.

The first passage 340 extends from the first passage 120 of the inlet housing 100 to the second outlet 320. That is, the second water supply outlet housing 300 and the protrusion 330 which are formed to communicate with the inlet housing 100 communicate with each other. And, the third passage 340 in the second water supply valve outlet housing 300 extends from the first passage 120, which communicates with the inlet housing 100, to the second outlet 320.

Although not illustrated in the drawings, according to an exemplary embodiment of the present invention, the second water supply valve outlet housing 300 is connected to the softener container or box to output water in which the water supplied through the passage 120 and the second water supply valve outlet 320 is transferred to a softener container or box (not shown) positioned in or at least partially over the drum of the washing machine.

The second water supply valve outlet housing 300 of the water supply valve 10 for the wall mounted drum type washing machine according to one or more exemplary embodiments of the present disclosure may further include insertion holes 350. A plurality of the insertion holes 350 may be included at a portion of the seating part 310. The end of the fixing or fastening bracket 700 as described below is fixed or fastened to the upper surface of the second water supply valve outlet housing 300 by a fastener such as a bolt, a screw, and a rivet.

One water supply valve assembly having the two passages for supplying water to the detergent container and the softener container may be placed in a minimal (e.g., the least) amount of space, such that the wall mounted drum type washing machine may be miniaturized, and the manufacturing cost and assembling time may be reduced, thereby improving productivity.

Figure 7:
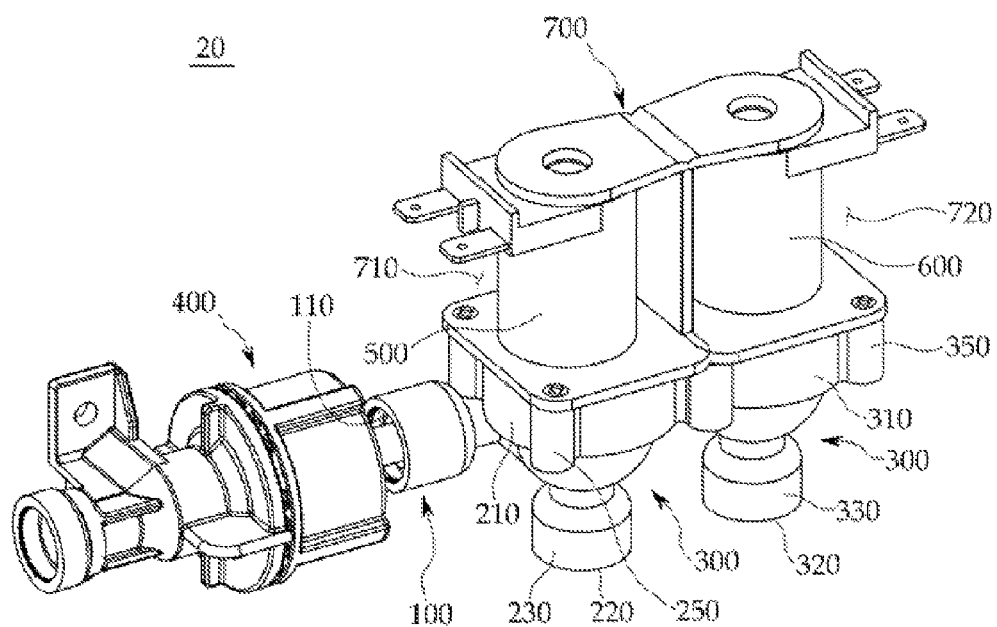
FIG. 7 is a front perspective view of a water supply valve assembly for a wall mounted drum type washing machine according to one or more exemplary embodiments of the present disclosure.
Figure 8:
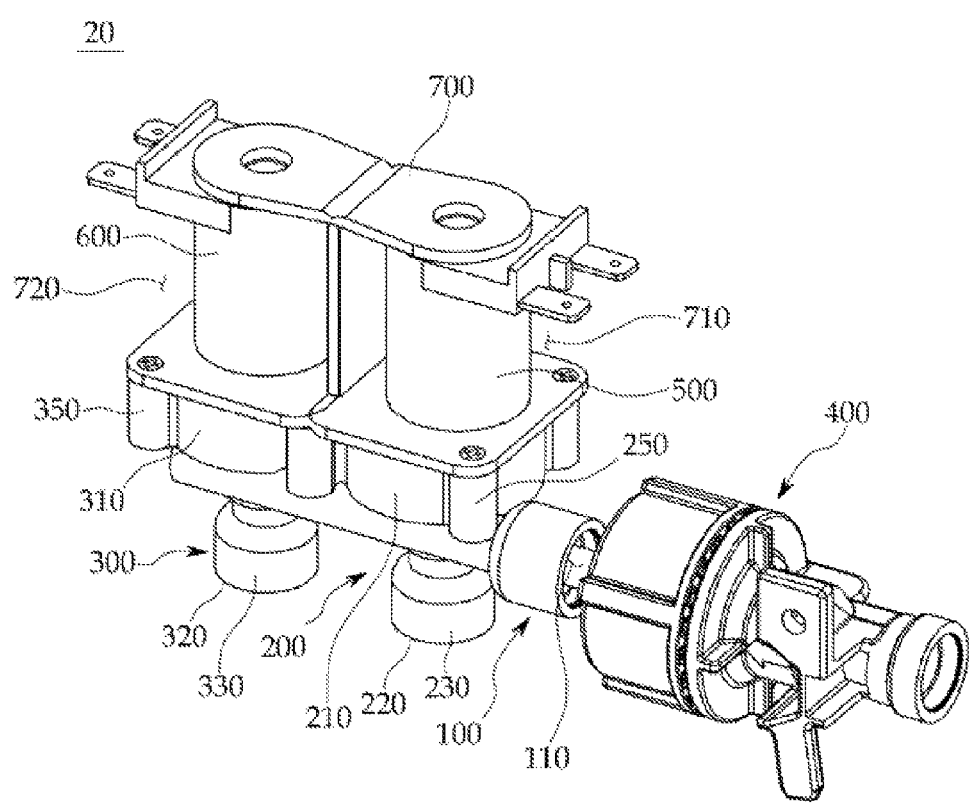
FIG. 8 is a rear perspective view of the water supply valve assembly for a wall mounted drum type washing machine according to one or more exemplary embodiments of the present disclosure.

FIG. 7 is a front perspective view of the water supply valve assembly 20 for a wall mounted drum type washing machine according to one or more exemplary embodiments of the present disclosure, FIG. 8 is a rear perspective view of the water supply valve assembly 20 for a wall mounted drum type washing machine according to one or more exemplary embodiments of the present disclosure, and FIG.

9 is a plan view of the water supply valve assembly 20 for a wall mounted drum type washing machine according to one or more exemplary embodiments of the present disclosure.

The water supply valve assembly 20 for a wall mounted drum type washing machine according to one or more exemplary embodiments of the present disclosure will be described with reference to FIGS. 7 to 9. The water supply valve assembly 20 for a wall mounted drum type washing machine according to one or more exemplary embodiments of the present disclosure includes the water supply valve assembly 10 described above, a check valve 400, a first solenoid valve 500, and a second solenoid valve 600.

The water supply inlet 100 is already described above and therefore the description thereof will be omitted.

Figure 9:
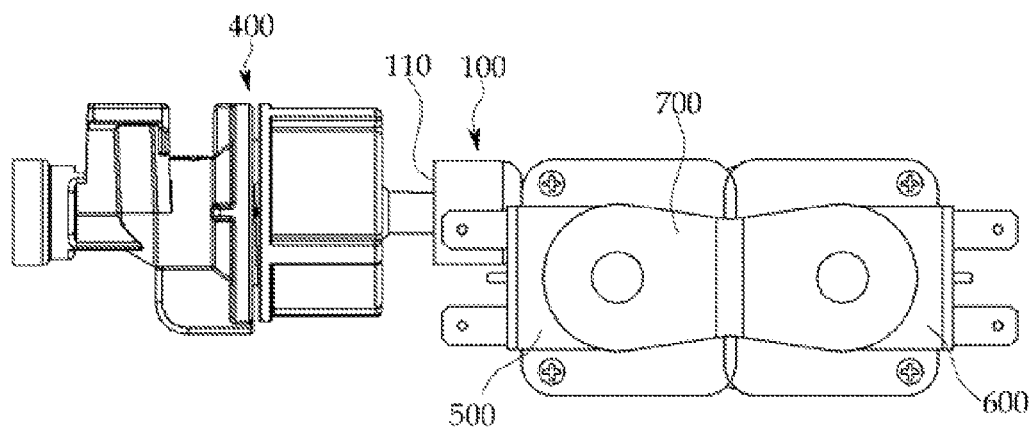
FIG. 9 is a plan view of the water supply valve assembly for a wall mounted drum type washing machine according to one or more exemplary embodiments of the present disclosure.

As illustrated in FIGS. 7 to 9, the check valve 400 is connectable to the inlet 110 at one end or portion of the inlet housing 100. Although not illustrated in the drawings, the check valve 400 is configured to supply the water from a water supply pipe, having one end connected to a faucet, to the water supply valve assembly 10 during each washing cycle of the wall mounted drum type washing machine.

The first solenoid valve 500 is coupled to the seating part 210 which is at the upper portion of the first water supply valve outlet housing 200, and the second solenoid valve 600 is coupled to the seating part 310 which is at the upper portion of the second water supply valve outlet housing 300.

Although not necessarily limited thereto, the first solenoid valve 500 and the second solenoid valve 600 of the water supply valve assembly 20 according to one or more exemplary embodiments of the present disclosure includes a cylindrical solenoid valve housing. A bobbin or plunger around which the solenoid coil is wound is inserted into the solenoid valve housing. An upper end of the solenoid valve housing has a terminal which applies power to a solenoid coil. When the power is applied to the solenoid coil, a magnetic field is generated by the solenoid coil to open and close the first water supply valve outlet 220 or the second water supply valve outlet 320 while the plunger moves linearly and/or vertically.

As illustrated in FIGS. 7 to 9, the water supply valve assembly 20 for a wall mounted drum type washing machine according to one or more exemplary embodiments of the present disclosure may further include the fixing bracket 700 having an I shape or a T shape.

According to one or more exemplary embodiments of the present disclosure, a left end of the fixing bracket 700 is fixed or fastened to the upper surface of the first water supply valve outlet housing 200 by inserting a fastener such as a bolt, a screw, or a rivet into the insertion hole 250, and a right end of the fixing bracket 700 is fixed or fastened to the upper surface of the second water supply valve outlet housing 300 by inserting a fastener such as a bolt, a screw, or a rivet into the insertion hole 350.

According to one or more exemplary embodiments of the present disclosure, a lower portion of the first solenoid valve 500 is inserted into a seating part 210 at the upper portion of the first water supply valve outlet housing 200 in the state in which the first solenoid valve 500 is inserted into a space part 710 of the fixing bracket that is adjacent inlet housing 100. A lower portion of the second solenoid valve 600 is inserted into the seating part 310 formed at the upper portion of the second water supply valve outlet housing 300 in the state in which the second solenoid valve 600 is inserted into a space part 720 of the fixing bracket adjacent first solenoid valve 500. Therefore, the first and second solenoid valves 500 and 600 are firmly fixed or fastened with the first water supply valve outlet housing 200 and the second water supply valve outlet housing 300.

According to exemplary embodiments of the present invention, the water supply valve assembly 20 described above is not necessarily fixed or fastened to a rear surface of the tub 2 of the wall mounted drum type washing machine 1, but to the upper surface of the tub 2 by a fastener (not illustrated) such as one or more bolts, bolts and nuts, rivets, or screws. Therefore, the mounting space of the single water supply valve assembly 20 having the two passages may be minimized, and the miniaturization of the wall mounted drum type washing machine may be promoted.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A water supply valve assembly for a wall mounted drum type washing machine, comprising:
an integrated inlet housing, first water supply valve outlet housing and second water supply valve outlet housing wherein:
the inlet housing comprises an inlet into which water enters, and a first passage along an inner cavity thereof;
the first water supply valve outlet housing is integral with and adjacent to the inlet housing and configured to communicate with the first passage; and
the second water supply valve outlet housing is integral with and adjacent to the first water supply valve outlet housing and is configured to communicate with the first passage,
wherein the first passage is configured for water flow to continue over the first water supply value outlet housing to second water supply value outlet housing, and
wherein the first water supply valve outlet housing and the second water supply valve outlet housing are arranged on the same side of the inlet housing and configured not to communicate with each other.

2. The water supply valve assembly of claim 1, wherein the first water supply valve outlet housing comprises:
a seating part at an upper portion of the first water supply valve outlet housing and having a first solenoid valve thereon;
a protrusion on a lower portion of the first water supply valve outlet housing and having a first outlet at a lower end thereof; and
a second passage extending from the first passage to the first outlet.

3. The water supply valve assembly of claim 2, wherein the first water supply valve outlet housing further comprises a plurality of insertion holes in the seating.

4. The water supply valve assembly of claim 2, wherein the second water supply valve outlet housing comprises:
a seating part at an upper portion of the second water supply valve outlet housing comprising a solenoid valve thereon;
a protrusion protruding from a lower portion of the second water supply outlet housing and having a second outlet at a lower end thereof; and
a third passage extending from the first passage to the second outlet.

5. The water supply valve assembly of claim 3, wherein the second water supply valve outlet housing comprises:
- a seating part at an upper portion of the second water supply valve outlet housing comprising a solenoid valve thereon;
- a protrusion protruding from a lower portion of the second water supply outlet housing and having a second outlet at a lower end thereof; and
- a third passage extending from the first passage to the second outlet.

6. The water supply valve assembly of claim 5, wherein the second water supply valve outlet housing further comprises a plurality of insertion holes in the seating part.

7. The water supply valve assembly of claim 1, further comprising a check valve at the inlet.

8. The water supply valve assembly of claim 7, further comprising a first solenoid valve on a first seating part at an upper portion of the first water supply valve outlet housing.

9. The water supply valve assembly of claim 8, further comprising a second solenoid valve in a second part at an upper portion of the second water supply valve outlet housing.

10. The water supply valve assembly of claim 8, further comprising:
- a fixing bracket having an I shape or a T shape, wherein a first part of the fixing bracket is fixed or fastened with the first solenoid valve, and a second part of the fixing bracket is fixed or fastened with the second solenoid valve.

11. The water supply valve assembly of claim 9, wherein the fixing bracket is coupled with upper ends of the first and second seating parts by one or more screws or bolts in insertion holes in each of the first and second seating parts.

12. The water supply valve assembly of claim 1, wherein the first passage extends through the inlet housing, the first water supply valve outlet housing, and the second water supply valve outlet housing.

13. A wall mounted drum type washing machine, comprising:
- the water supply valve assembly of claim 1;
- a detergent container configured to receive water from one of the first and second water supply valve outlet housings;
- a softener container configured to receive water from the other of the first and second water supply valve outlet housings; and
- a drum configured to receive water and detergent from the detergent container and water and softener from the softener container.

* * * * *